(12) United States Patent
Steiner et al.

(10) Patent No.: US 11,014,521 B2
(45) Date of Patent: May 25, 2021

(54) AIRBAG FOR A VEHICLE OCCUPANT RESTRAINT SYSTEM OF A MOTOR VEHICLE

(71) Applicant: TB Deu Abwicklungs-Aktiengesellschaft, Aschaffenburg (DE)

(72) Inventors: Torsten Steiner, Berlin (DE); Karl-Heinz Bürlen, Ulm/Donaustetten (DE); Christian Weyrich, Elchingen (DE); Hans-Peter Sendelbach, Senden (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 62 days.

(21) Appl. No.: 16/190,916

(22) Filed: Nov. 14, 2018

(65) Prior Publication Data
US 2019/0161052 A1 May 30, 2019

(30) Foreign Application Priority Data

Nov. 15, 2017 (DE) .................... 10 2017 220 391.9
Feb. 12, 2018 (DE) .................... 10 2018 103 071.1

(51) Int. Cl.
*B60R 21/233* (2006.01)
*B60R 21/207* (2006.01)
(Continued)

(52) U.S. Cl.
CPC .......... *B60R 21/233* (2013.01); *B60R 21/207* (2013.01); *B60R 21/2338* (2013.01);
(Continued)

(58) Field of Classification Search
CPC ............ B60R 21/233; B60R 21/23138; B60R 21/207; B60R 21/2338;
(Continued)

(56) References Cited

U.S. PATENT DOCUMENTS 5,636,862 A 6/1997 Cheung et al.
5,730,464 A 3/1998 Hill
(Continued)

FOREIGN PATENT DOCUMENTS

DE 19646698 A1 * 5/1997 ......... B60R 21/2338
DE 10 2005 002 085 A1 10/2005
(Continued)

OTHER PUBLICATIONS

Machine Translation of WO2019110705 (Year: 2019).*

*Primary Examiner* — James A English
*Assistant Examiner* — Kurtis Nielson
(74) *Attorney, Agent, or Firm* — Gordon Rees Scully Mansukhani, LLP

(57) ABSTRACT

It is provided a gas bag for a vehicle occupant restraint system of a motor vehicle, comprising at least one first inflatable chamber configured for the protection of the head of a vehicle occupant; at least one second inflatable chamber configured for the protection of a shoulder and/or thorax region of the vehicle occupant, wherein the gas bag is to be arranged in or on a side of a vehicle seat facing the vehicle interior space. The first and the second chamber are rotatable relative to each other in the inflated condition of the gas bag.

18 Claims, 4 Drawing Sheets

(51) Int. Cl.
  *B60R 21/2338* (2011.01)
  *B60R 21/231* (2011.01)
  *B60R 21/00* (2006.01)

(52) U.S. Cl.
  CPC ............... *B60R 21/23138* (2013.01); *B60R 2021/0044* (2013.01); *B60R 2021/0048* (2013.01); *B60R 2021/0058* (2013.01); *B60R 2021/23308* (2013.01); *B60R 2021/23316* (2013.01); *B60R 2021/23332* (2013.01); *B60R 2021/23386* (2013.01)

(58) Field of Classification Search
  CPC ........... B60R 2021/23332; B60R 2021/23386; B60R 2021/23308; B60R 2021/23316
  USPC .......................................... 280/729
  See application file for complete search history.

(56) References Cited

U.S. PATENT DOCUMENTS

| | | | |
|---|---|---|---|
| 6,062,594 A * | 5/2000 | Asano | B60R 21/23138 280/729 |
| 7,549,672 B2 * | 6/2009 | Sato | B60R 21/207 280/729 |
| 7,819,423 B2 | 10/2010 | Loibl et al. | |
| 7,828,322 B2 | 11/2010 | Breuninger et al. | |
| 9,623,829 B2 * | 4/2017 | Gwon | B60R 21/207 |
| 9,707,922 B2 | 7/2017 | Wiik | |
| 10,543,801 B2 * | 1/2020 | Kwon | B60R 21/23138 |
| 2005/0189742 A1 * | 9/2005 | Kumagai | B60R 21/207 280/730.2 |
| 2006/0131847 A1 | 6/2006 | Sato et al. | |
| 2007/0182135 A1 * | 8/2007 | Kai | B60R 21/23138 280/730.2 |
| 2009/0184500 A1 * | 7/2009 | Feller | B60R 21/23138 280/730.2 |
| 2009/0212539 A1 * | 8/2009 | Honda | B60R 21/261 280/729 |
| 2010/0171291 A1 * | 7/2010 | Schmidt | B60R 21/23138 280/730.2 |
| 2010/0295277 A1 * | 11/2010 | Ochiai | B60R 21/23138 280/729 |
| 2011/0012330 A1 * | 1/2011 | Sato | B60R 21/23138 280/730.2 |
| 2011/0049852 A1 | 3/2011 | Kibat et al. | |
| 2012/0049498 A1 | 3/2012 | Wiik | |
| 2012/0091697 A1 | 4/2012 | Wiik et al. | |
| 2013/0076014 A1 | 3/2013 | Thomas et al. | |
| 2013/0328294 A1 | 12/2013 | Fukawatase et al. | |
| 2014/0151984 A1 | 6/2014 | Fukawatase et al. | |
| 2015/0314748 A1 | 11/2015 | Mihm | |
| 2017/0158158 A1 | 6/2017 | Thomas | |

FOREIGN PATENT DOCUMENTS

| | | | |
|---|---|---|---|
| DE | 10 2005 059 197 A1 | 7/2007 | |
| DE | 10 2008 063 794 A1 | 7/2009 | |
| DE | 102008064571 A1 * | 9/2009 | ........ B60R 21/2338 |
| DE | 10 2010 039 882 A1 | 3/2011 | |
| DE | 10 2011 081 478 A1 | 3/2012 | |
| DE | 10 2011 084 093 A1 | 4/2012 | |
| DE | 10 2012 216 896 A1 | 3/2013 | |
| DE | 10 2016 123 291 A1 | 6/2017 | |
| DE | 11 2015 005 589 T5 | 9/2017 | |
| EP | 2 979 934 A1 | 2/2016 | |
| EP | 2 960 116 B1 | 8/2017 | |
| KR | 10-2017-0051824 | 5/2017 | |
| WO | WO 2016/081838 A1 | 5/2016 | |
| WO | WO 2017/165492 A1 | 9/2017 | |
| WO | WO-2019110705 A1 * | 6/2019 | ........... B60R 21/233 |

\* cited by examiner

AIRBAG FOR A VEHICLE OCCUPANT RESTRAINT SYSTEM OF A MOTOR VEHICLE

REFERENCE TO RELATED APPLICATION

This application claims priority to German Patent Application No. 10 2017 220 391.9 filed on Nov. 15, 2017, and to German Patent Application No. 10 2018 103 071.1 filed on Feb. 12, 2018, the entirety of which is incorporated by reference herein.

BACKGROUND

This disclosure relates to a gas bag for a vehicle occupant restraint system of a motor vehicle.

Such far-side gas bag is disclosed for example in DE 10 2005 059 197 A1. These gas bag, however, involve the risk that in the event of an impact of the vehicle occupant on the inflated gas bag due to an accident a relative movement occurs between the head of the vehicle occupant and his torso, which can result for example in a hyperextension of the neck.

SUMMARY

The problem underlying the proposed solution consists in minimizing the risk of injury in the event of an impact on the gas bag.

This problem is solved by the provision of a gas bag with features as described herein.

Accordingly, in a first aspect there is provided a gas bag for a vehicle occupant restraint system of a motor vehicle, comprising

- at least one first inflatable chamber configured for the protection of the head of a vehicle occupant;
- at least one second inflatable chamber configured for the protection of a shoulder and/or thorax region of the vehicle occupant,
- wherein the gas bag is to be arranged in or on a side of a vehicle seat facing the vehicle interior space, wherein the first and the second chamber are rotatable relative to each other in the inflated condition of the gas bag.

As a far-side gas bag, the gas bag in particular provides protection in the event of a side collision that occurs on the vehicle long side more remote from the vehicle seat. For example, the gas bag is disposed in or on a side of a drivers seat that faces the passenger long side, and/or it is arranged in or on a side of the passenger seat facing the drivers seat. In particular, the gas bag can help to avoid much swaying of the vehicle occupant towards the collision side of the vehicle.

Due to the rotatability of the first and the second chamber relative to each other, a relative movement between the first and the second chamber also can occur in the event of an impact of the vehicle occupant with his shoulder and/or thorax region on the second chamber associated with this body region. For example, after the impact the first chamber is not urged away in the transverse vehicle direction to the same extent as the second chamber and thus still supports the head of the vehicle occupant. Due to this configuration of the gas bag it is possible in particular to counteract a movement of the head of the vehicle occupant relative to his torso and hence for example counteract a hyperextension of the neck. The first chamber in particular is disposed above the second chamber—based on the inflated condition of the gas bag and seen along the vehicle height direction.

It is also possible that the first chamber is attached to another portion of the gas and/or can be attached to a vehicle part different from the gas bag (for example to a part of the vehicle seat) via at least one fastening element (for example in the form of a catch strap). For example, by means of the fastening element the first chamber can also be held in position in the event of an impact of the vehicle occupant with his shoulder and/or thorax region on the gas bag (in particular on the second chamber), while as a result of the impact the second chamber turns away from the first chamber by following the movement of the vehicle occupant. It is also conceivable that in the inflated condition of the gas bag the fastening element acts on the first chamber such that already before the impact the first chamber is at least sectionally rotated with respect to the second chamber in the direction of the vehicle occupant. In this case, after inflation of the gas bag, the first chamber hence is at least partly (as seen in transverse vehicle direction) disposed closer to the head of the vehicle occupant than the second chamber already before the impact.

According to another exemplary embodiment, the gas bag includes a (e.g. channel-like) connecting portion via which the first and the second chamber are in flow connection with each other during the inflation of the gas bag, wherein the two chambers are rotatable against each other by twisting the connecting portion. It is conceivable that the connecting portion—based on the condition of the gas bag inflated and mounted on the vehicle seat and as seen in the direction of forward travel—is arranged in a rear region of the gas bag.

For example, the two chambers are rotatable against each other about an axis of rotation specified by the connecting portion, in particular at least approximately parallel to the connecting portion. Based on the inflated condition of the gas bag, the connecting portion extends for example at least approximately parallel to the vehicle height direction, wherein the axis of rotation correspondingly can likewise extend at least approximately parallel to the vehicle height direction.

According to another development the first chamber is separated from the second chamber by a cutout extending from a front side of the gas bag (as seen in the direction of forward travel) up to the connecting portion and thus is decoupled from the second chamber in particular in this region. For example, an (in particular lower) portion of the first chamber and an (in particular upper) portion of the second chamber adjoins the cutout. In particular, the cutout at least approximately extends along the longitudinal vehicle axis (based on the inflated condition of the gas bag).

It is conceivable in addition that the first and the second chamber are connected to each other beyond the cutout by means of a connecting element. By means of this connecting element in particular partial slipping of the vehicle occupant through the cutout can be counteracted. It is also conceivable that by means of the connecting element the relative movement between the first and the second chamber is limited. For example, the connecting element (for example in the form of a strap or a sail) is formed of at least one material layer (in particular a fabric layer). The dimensions of the connecting element in particular are chosen such that in the inflated condition of the gas bag it is not tensioned, but loosely extends between the first and the second chamber. It is also conceivable that the connecting element covers a large part of the cutout or even the cutout completely.

In a second aspect, the solution relates to a gas bag for a vehicle occupant restraint system of a motor vehicle, which in particular is configured as described above, comprising at least one first inflatable chamber configured for the protection of the head of a vehicle occupant;

at least one second inflatable chamber configured for the protection of a thorax region of the vehicle occupant, wherein the gas bag is to be arranged in or on a side of a vehicle seat facing the vehicle interior space, and wherein the gas bag is configured such that during the inflation of the gas bag the first chamber moves relative to the second chamber towards a vehicle occupant sitting on the vehicle seat.

In the event of an activation of the gas bag effected in connection with a collision of the vehicle (in particular a side collision) the first chamber thus will move in the direction of the head of the vehicle occupant, whereby the head region is coupled to the gas bag at a time of the collision as early as possible. In this way, in particular a movement of the head of the vehicle occupant relative to his torso can be counteracted, whereby in particular the load acting on the neck region of the vehicle occupant is reduced and a hyperextension of the neck can be avoided as far as possible.

The gas bag according to the solution for example is configured such that in the inflated condition of the gas bag and as seen in vehicle height direction the first chamber at least partly extends further across the vehicle seat than the second chamber. Thus, the first chamber (in particular already at an early time of the collision)—as seen in vehicle direction—is disposed closer to the head of the vehicle occupant than the second chamber.

It is also possible that in the inflated condition of the gas bag the first chamber at least partly extends before the vehicle occupant as seen in the direction of forward travel. In particular, the first chamber is at least partly disposed in front of the head and/or a shoulder region of the vehicle occupant in order to provide for coupling of the head and possibly also of the shoulder region of the vehicle occupant to the gas bag as good and early as possible.

According to another embodiment, the first chamber performs a tilting and/or rotary movement relative to the second chamber towards the vehicle occupant during the inflation of the gas bag. This tilting or rotary movement for example is effected at least partly around an axis that extends at least approximately parallel to the vehicle height direction.

It is conceivable in addition that the movement of the first chamber relative to the second chamber is supported or generated by at least one connecting element that couples the first and the second chamber to each other or via which the first chamber is connectable to a vehicle part (in particular a vehicle seat) different from the gas bag. For example, the connecting element, as already explained above with respect to the first aspect, is a for example strap- or sail-like piece of material (in particular a piece of fabric).

Furthermore, the gas bag according to the second aspect also can include a connecting portion via which the first and the second chamber are in flow connection with each other during the inflation of the gas bag. The connecting portion for example extends in a rear region of the gas bag as already explained above with respect to the first aspect.

In addition, a partial section of the first chamber located before the connecting portion—as seen in the direction of forward travel—can be fixed to the second chamber; for example via at least one seam. Via this connection between the first and the second chamber in particular the movement of the first chamber relative to the second chamber towards the vehicle occupant is generated.

Furthermore, the second chamber can comprise a middle portion at least sectionally defined by a seam, wherein a front portion of the first chamber is connected to the middle portion, to a region of a circumference of the middle portion of the second chamber and/or an inflatable region of the second chamber surrounding the middle portion. The front portion of the first chamber for example is the above-mentioned partial section of the first chamber located before the connecting portion. The connection of the front portion of the first chamber to the second chamber for example is effected via a separate seam. It is also conceivable, however, that the connection is effected via a seam already present there; e.g. via the seam that defines the middle portion of the second chamber. In the inflated condition of the gas bag, the middle portion of the second chamber for example has a smaller thickness (as seen in transverse vehicle direction) than the region of the second chamber surrounding the same (for example annularly). It is also conceivable that the middle portion of the second chamber is designed non-inflatable.

According to another variant, the movement of the first chamber relative to the second chamber is supported or produced by the shape of the gas bag and/or at least one seam. In particular, the gas bag has a correspondingly designed so-called 3D shape. For example, such a 3D gas bag is manufactured by means of the "one-piece woven" method. It is also conceivable, however, that the 3D gas bag is fabricated by sewing from at least one material blank.

It is noted that the developments explained above with respect to the first aspect can of course also correspondingly be applied to the second aspect. In particular, the gas bag of the second aspect also can include the cutout explained above, which partly decouples the first chamber from the second chamber.

The solution also relates to a vehicle seat with a gas bag configured as described above (according to the first or the second aspect).

BRIEF DESCRIPTION OF THE DRAWINGS

The solution will be explained in detail below by means of exemplary embodiments with reference to the Figures.

DETAILED DESCRIPTION

Figure 1:
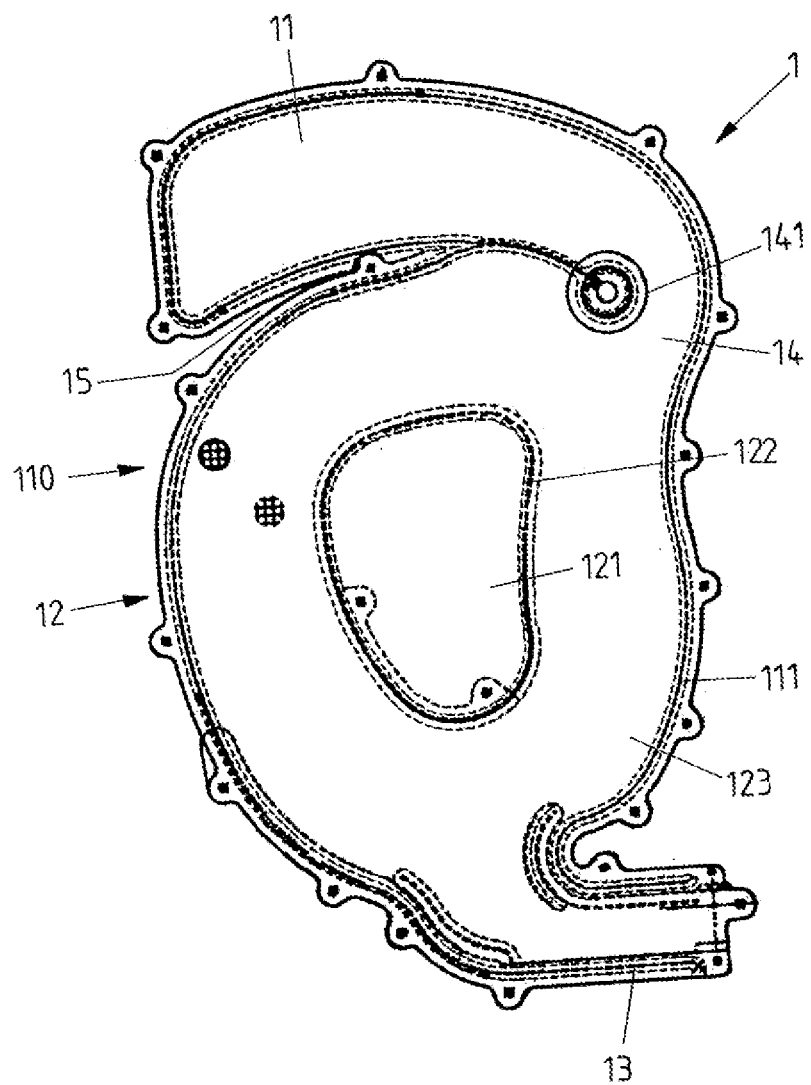
FIG. 1 shows a side view of a gas bag according to a first exemplary embodiment.

The gas bag 1 according to the solution, which in FIG. 1 is shown in the inflated condition, represents an exemplary embodiment of the first aspect. Accordingly, the gas bag 1 includes a first inflatable chamber in the form of a head chamber 11 and a second chamber in the form of a thorax chamber 12. Via a blow-in orifice 13, the gas bag 1 can be filled with gas of a gas generator (not shown). The first and second chambers 11, 12 in particular are defined by two material layers that are connected to each other via at least one circumferential seam 111.

In addition, the gas bag 1 includes a connecting portion in the form of a connecting channel (filling channel) 14 via which the first and the second chamber 11, 12 are in flow connection with each other during the inflation of the gas bag 1. The connecting channel 14 laterally is defined by a dart 141 and by the circumferential seam 111. Furthermore, the gas bag 1 includes a cutout 15 extending from its front side 110 up to the dart 141. The cutout 15 separates the head chamber 11 from the thorax chamber 12 in a region of the gas bag located before the connecting channel 14. In particular, the head and thorax chambers 11, 12 are decoupled by the cutout 15 such that they are rotatable relative to each other by twisting the connecting channel 14. Correspondingly, an axis of rotation, about which the thorax chamber 12 is rotatable with respect to the head chamber 11, extends along the connecting channel 14 and hence—based on the condition of the gas bag 1 mounted in the vehicle—at least approximately along the vehicle height direction.

Figure 2:
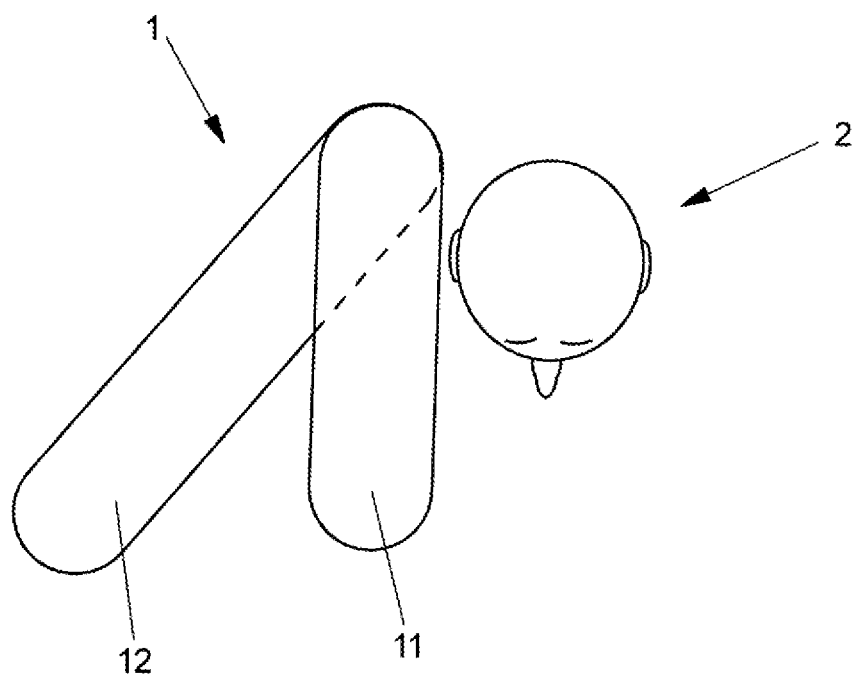
FIG. 2 schematically show the gas bag of FIG. 1 from above.

FIG. 2 shows the gas bag 1 of FIG. 1 in a schematic representation in a view from above and in the inflated condition, wherein the gas bag 1 is arranged on or in a vehicle seat (not shown), namely on the side of the seat facing the vehicle interior space. The rotatability of the head and thorax chambers 11, 12 relative to each other leads to the fact that in the event of an impact of the shoulder region of a vehicle occupant 2 to be protected on the gas bag 1 in the region of the thorax chamber 12, which occurs as a result of a side collision, the thorax chamber 12 is pivoted relative to the head chamber 11 towards the point of collision. The head chamber 11 does not follow the movement of the thorax chamber 12 or only to a smaller extent, so that it at least substantially maintains its position. Thus, the head chamber 11 remains able to support the head of the vehicle occupant 2 and/or provide for coupling of the head of the vehicle occupant 2 to the gas bag 1 at the earliest possible time of the collision.

Figure 3:
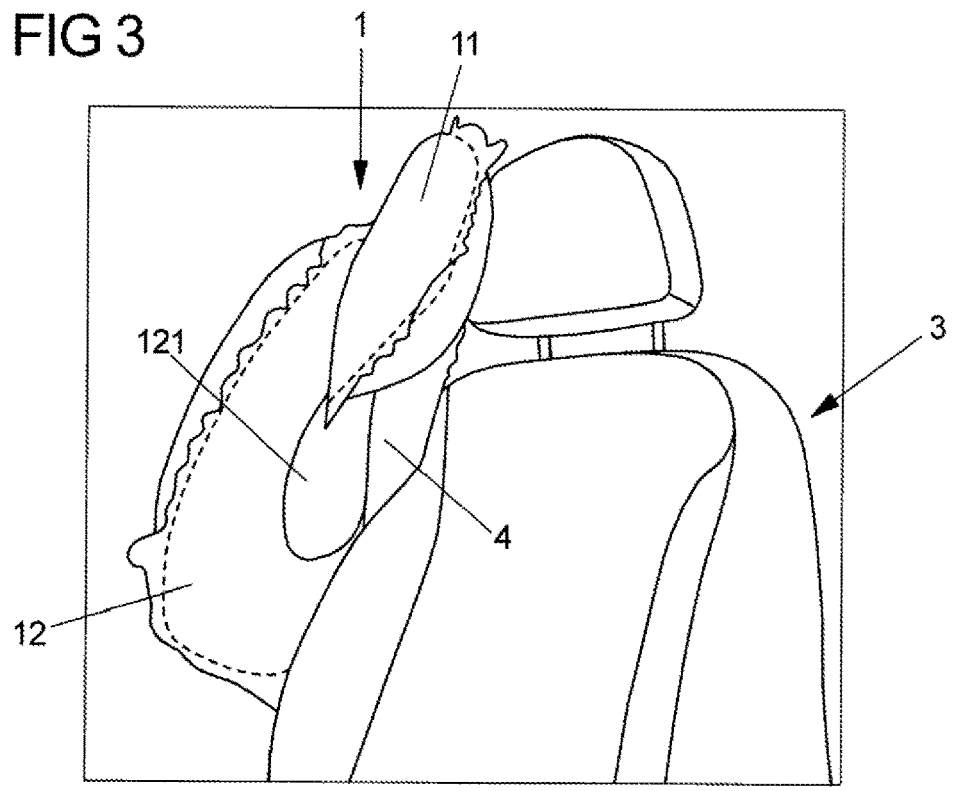
FIG. 3 shows a modification of the gas bag of FIG. 1.
Figure 4:
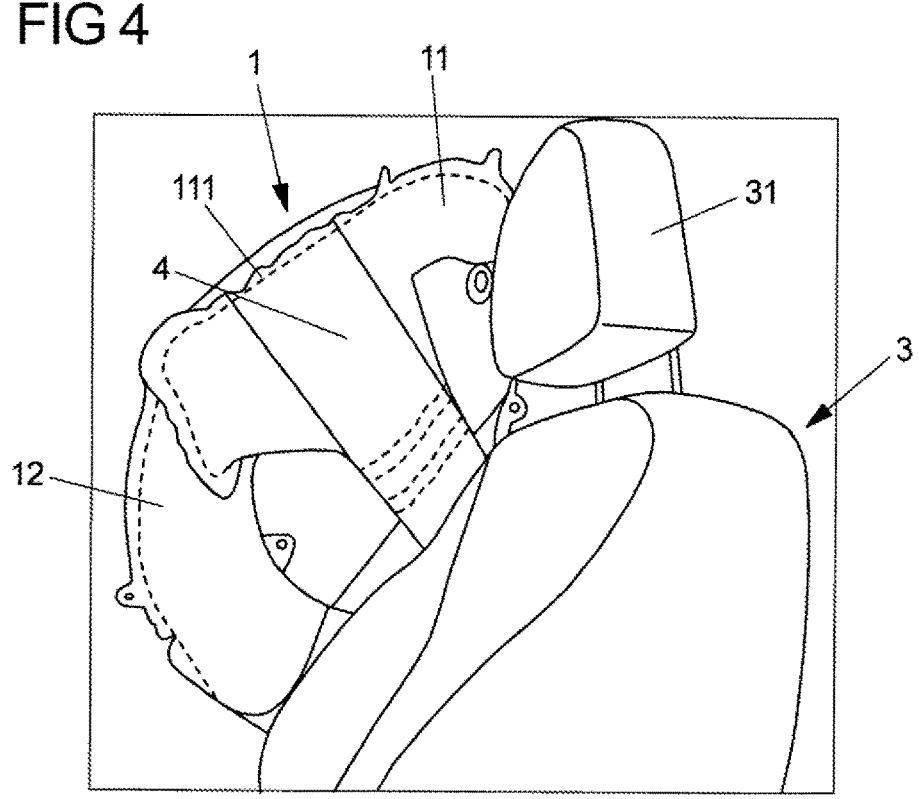
FIG. 4 shows the gas bag of FIG. 3 in another view.

FIGS. 3 and 4 show different perspective views of a modification of the gas bag 1 of FIGS. 1 and 2, wherein here the vehicle seat 3, on which the gas bag 1 (as a far-side gas bag) is arranged, also is shown. In this exemplary embodiment, the head chamber 11 is connected to the vehicle seat 3 via a fastening element in the form of a catch strap 4. The catch strap 4 stabilizes the position of the head chamber 11 in the inflated condition of the gas bag 1 and counteracts a movement of the head chamber 11 towards the point of collision in order to achieve the best possible restraining effect with respect to the head of the vehicle occupant (not shown in FIG. 3).

In the present case, the catch strap 4 is connected to an upper portion of the head chamber 11, wherein it is fixed in this region e.g. via a portion of the circumferential seam 111. Furthermore, the gas bag 1 can be configured by means of the catch strap 4 such that in the inflated condition of the gas bag 1 the head chamber 11 is inclined relative to the thorax chamber 12 already before the impact of the vehicle occupant, namely such that as seen in transverse vehicle direction the head chamber 11 at least sectionally extends further across the vehicle seat 3 than the thorax chamber 12, i.e. at least a part of the head chamber 11 is disposed closer to the vehicle long side nearest to the vehicle seat 3 than the thorax chamber 12. Correspondingly, the distance between the head chamber 11 and the head of the vehicle occupant (or a headrest 31) as seen in transverse vehicle direction is smaller than the distance between the thorax chamber 12 and the head of the vehicle occupant.

Figure 5:
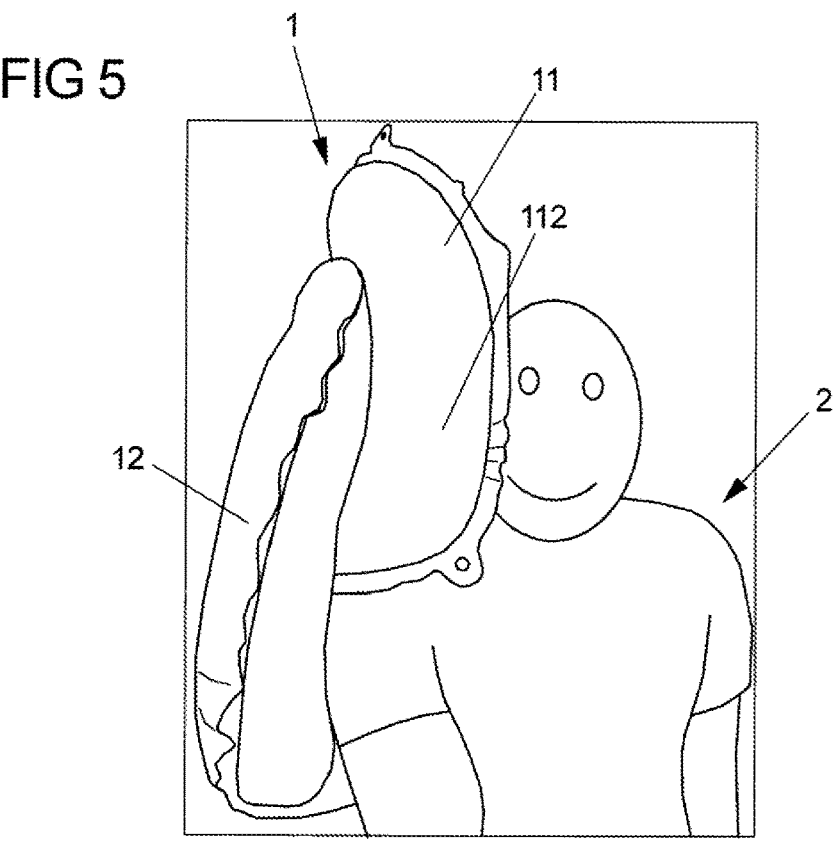
FIG. 5 shows a front view of a gas bag according to another exemplary embodiment.
Figure 6:
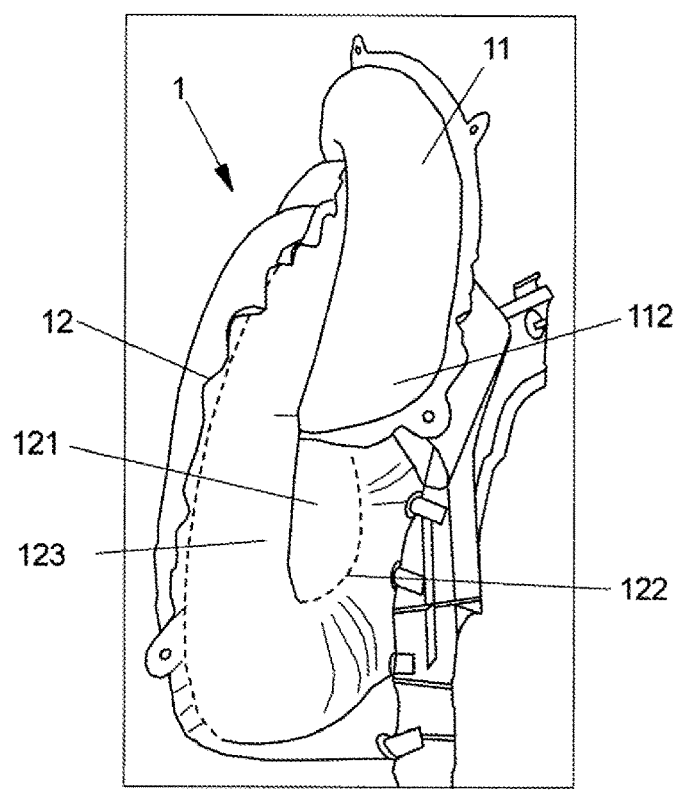
FIG. 6 shows the gas bag of FIG. 5 without the vehicle occupant to be protected.

FIGS. 5 and 6 relate to an exemplary embodiment of a gas bag 1 according to the second aspect. Accordingly, the gas bag 1 includes a head chamber 11 and a thorax chamber 12, wherein the gas bag 1 is configured such that during the inflation of the gas bag 1 the head chamber 11 moves towards the vehicle occupant 2 relative to the thorax chamber 12 (in particular performs a corresponding tilting or rotary movement). In the inflated condition of the gas bag 1 the head chamber 11 therefore extends further beyond the vehicle seat than the thorax chamber 12 so that the distance between the head chamber 11 and the head of the vehicle occupant 2 as seen in transverse vehicle direction is smaller than the distance of the thorax chamber 12 from the head. Furthermore, a front portion 112 of the head chamber 11 extends before the vehicle occupant 2 as seen in the direction of forward travel, namely in particular before a shoulder region.

This configuration of the gas bag 1 effects coupling of the head of the vehicle occupant 2 to the head chamber 11 as early as possible and also can counteract slipping of the shoulder region of the vehicle occupant from the gas bag 1 (in particular towards the front).

FIG. 6 shows that the gas bag 1 in the region of the thorax chamber 12 includes a middle portion 121 that is defined by a circumferential seam 122. In particular, the middle portion 121 is a non-inflatable region of the gas bag 1, wherein an inflatable region of the thorax chamber 12 extends around the middle portion 121 as a ring 123 (inner ring). The head chamber 11 is separated from the thorax chamber 12 by a cutout 15 extending up to a connecting channel 14 extending in the rear region of the gas bag 1, via which the head chamber 11 and the thorax chamber 12 are in flow connection with each other (analogous to FIGS. 1-4). It is noted that the second chamber 12 of FIGS. 1 to 4 also can include a middle portion 121 surrounded by a ring 123.

In contrast to FIGS. 1 to 4, however, the front region 112 of the head chamber 11 is connected to the middle portion 121 of the thorax chamber 12, to the seam 122 and/or to the inner ring 123. This connection of the front region 112 of the head chamber 11 to the thorax chamber 12 supports or generates the above-described displacement of the head chamber 11 towards the vehicle occupant 2 during the inflation of the gas bag 1. Alternatively or in addition, at least one catch strap might be present, via which the head chamber 11 is connected to another portion of the gas bag 1 or to the vehicle seat in order to generate the (in particular lateral) displacement of the head chamber 11.

The invention claimed is:

1. A gas bag for a vehicle occupant restraint system of a motor vehicle, comprising
- at least one first inflatable chamber configured for the protection of the head of a vehicle occupant;
- at least one second inflatable chamber configured for the protection of a shoulder and a thorax region of the vehicle occupant,
- wherein the gas bag is to be arranged in or on a side of a vehicle seat facing the vehicle interior space, and
- wherein in the inflated condition of the gas bag the first and the second chamber are rotatable relative to each other;
- a connecting portion via which the first and the second chamber are in flow connection with each other during the inflation of the gas bag,
- wherein the first chamber is separated from the second chamber by a cutout located in front of the connecting portion, and
- at least one fastening element via which the first chamber is attached to another portion of the gas bag or is attachable to a vehicle part different from the gas bag in such a way that the first chamber is held in position in the event of an impact of the vehicle occupant on the second chamber, while as a result of the impact the second chamber turns away from the first chamber.

2. The gas bag according to claim 1, wherein the first chamber is attached to the other portion of the gas bag or to the vehicle part different from the gas bag via the at least one fastening element.

3. The gas bag according to claim 1, wherein the two chambers are rotatable against each other by twisting the connecting portion.

4. The gas bag according to claim 3, wherein the two chambers are rotatable against each other about an axis of rotation specified by the connecting portion, in particular at least approximately parallel to the connecting portion.

5. The gas bag according to claim 3, wherein the cutout extends from a front side of the gas bag up to the connecting portion or up to a structure defining the connecting portion.

6. The gas bag according to claim 5, wherein the first and the second chamber are connected to each other across the cutout by means of a connecting element, in particular in the form of a strap or a sail.

7. The gas bag according to claim 1, wherein the second chamber comprises a middle portion at least sectionally defined by a seam, wherein a front portion of the first chamber is connected to a region of a circumference of the middle portion.

8. The gas bag according to claim 7, wherein a front portion of the first chamber is connected to an inflatable region of the second chamber surrounding the middle portion.

9. A vehicle seat with a gas bag according to claim 1.

10. The gas bag according to claim 1, wherein the second chamber comprises a middle portion at least sectionally defined by a seam, wherein a front portion of the first chamber is connected to an inflatable region of the second chamber surrounding the middle portion.

11. The gas bag according to claim 1, wherein the at least one first inflatable chamber is located above the at least one second inflatable chamber.

12. A gas bag for a vehicle occupant restraint system of a motor vehicle, comprising
at least one first inflatable chamber configured for the protection of the head of a vehicle occupant;
at least one second inflatable chamber configured for the protection of a thorax region of the vehicle occupant,
wherein the gas bag is to be arranged in or on a side of a vehicle seat facing the vehicle interior space, and
wherein the gas bag is configured such that during the inflation of the gas bag the first chamber moves relative to the second chamber towards a vehicle occupant sitting on the vehicle seat;
a connecting portion via which the first and the second chamber are in flow connection with each other during the inflation of the gas bag,
wherein the first chamber is separated from the second chamber by a cutout located in front of the connecting portion, and
at least one connecting element that couples the first and the second chamber to each other or via which the first chamber is connectable to a vehicle part different from the gas bag in such a way that the connecting element supports the movement of the first chamber relative to the second chamber.

13. The gas bag according to claim 12, wherein in the inflated condition of the gas bag and as seen in transverse vehicle direction the first chamber at least partly extends further across the vehicle seat than the second chamber.

14. The gas bag according to claim 12, wherein in the inflated condition of the gas bag the first chamber at least partly extends in front of the vehicle occupant.

15. The gas bag according to claim 12, wherein during the inflation of the gas bag the first chamber performs a rotary movement relative to the second chamber towards the vehicle occupant.

16. The gas bag according to claim 12, further comprising the connecting portion via which the first and the second chamber are in flow connection with each other during the inflation of the gas bag, wherein a partial section of the first chamber located before the connecting portion as seen in the direction of forward travel is fixed to the second chamber.

17. The gas bag according to claim 12, wherein the movement of the first chamber relative to the second chamber is supported by the shape of the gas bag.

18. The gas bag according to claim 12, wherein the at least one first inflatable chamber is located above the at least one second inflatable chamber.

* * * * *